United States Patent [19]

Hartemann

[11] 4,326,423
[45] Apr. 27, 1982

[54] PRESSURE TRANSDUCER WITH ELASTIC SURFACE WAVES AND IGNITION SYSTEM FOR INTERNAL COMBUSTION ENGINE UTILIZING THIS TRANSDUCER

[75] Inventor: Pierre Hartemann, Paris, France

[73] Assignee: Thomson-CSF, Paris, France

[21] Appl. No.: 139,661

[22] Filed: Apr. 14, 1980

[30] Foreign Application Priority Data

Apr. 18, 1979 [FR] France .................................. 79 09726

[51] Int. Cl.³ ................................................. G01L 9/06
[52] U.S. Cl. .................................... 73/861.63; 73/721;
123/414
[58] Field of Search ............. 310/313 R; 73/716, 717,
73/718, 719, 720, 721, 722, 723, 727, 118,
861.63; 123/414

[56] References Cited

U.S. PATENT DOCUMENTS 3,978,731  9/1976  Reeder et al. ..................... 73/723 X
4,100,811  7/1978  Cullen et al. ........................... 73/654
4,216,401  8/1980  Wagner ........................... 310/313 R

FOREIGN PATENT DOCUMENTS 1483344  8/1977  United Kingdom .

Primary Examiner—Jerry W. Myracle
Attorney, Agent, or Firm—Cushman, Darby & Cushman

[57] ABSTRACT

The invention relates to elastic surface wave pressure transducers. The invention has for its object a pressure transducer in which the plate is fixed by its periphery to a support having a central cavity in which a separating wall, forming an intermediate support, defines two chambers subject to the action of the pressures to be measured. The invention is more particularly applicable to the measurement of pressures and flow rates in the field of internal combustion engines.

14 Claims, 6 Drawing Figures

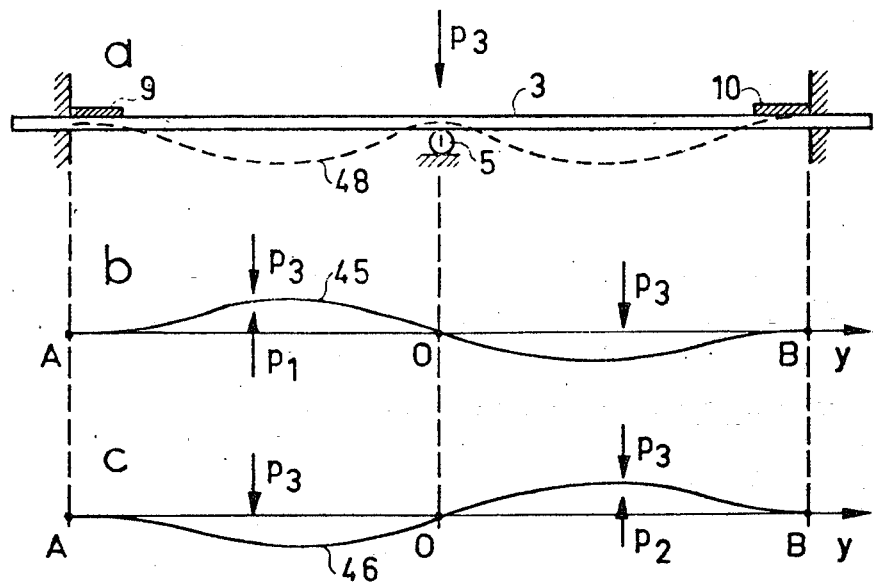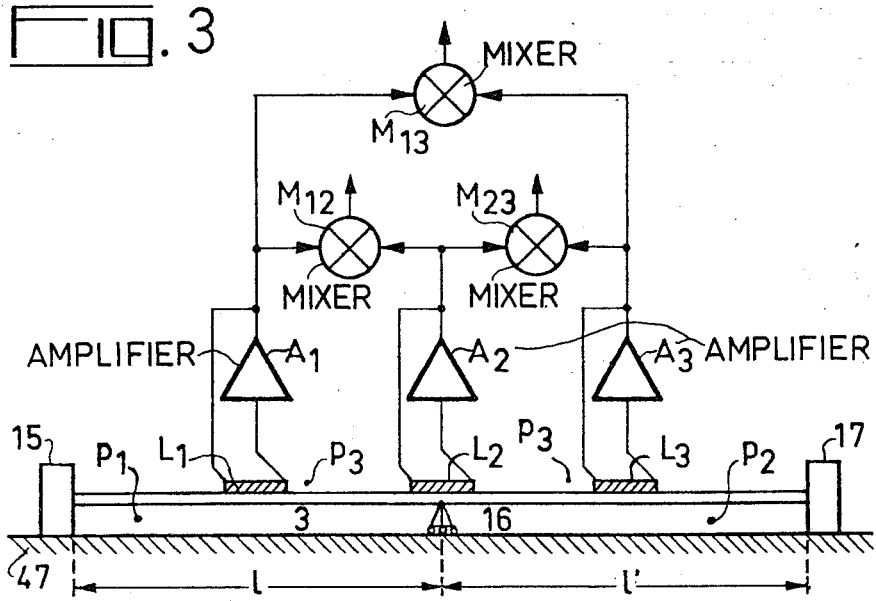

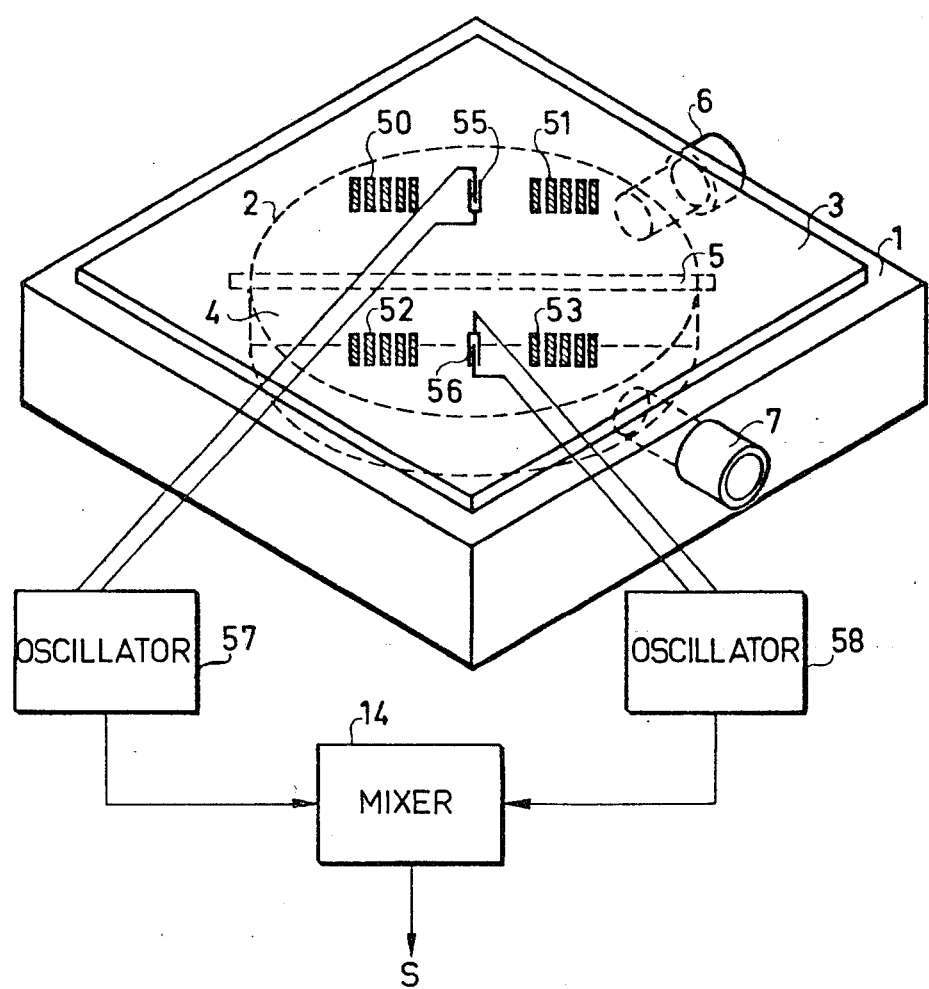

PRESSURE TRANSDUCER WITH ELASTIC SURFACE WAVES AND IGNITION SYSTEM FOR INTERNAL COMBUSTION ENGINE UTILIZING THIS TRANSDUCER

BACKGROUND OF THE INVENTION

The present invention relates to elastic surface wave transducers making it possible to convert the difference between two pressures into the frequency of an electric signal. Such a transducer has two tubes at the inlet of which appear the fluid pressures to be measured. A thin plate of piezoelectric material within the transducer elastically deforms under the pressure of the fluids. One of the faces of this plate carries four sets of electrodes in the form of interdigitated transducers in such a way as to form two electromechanical delay lines. The delay lines cooperate with two amplifiers so as to form two electrical oscillators, whose frequencies vary as a function of the deformations undergone by the plate. The transducers which form in pairwise manner the delay lines exchange elastic surface waves in two surface area of the plate where, for the same mechanical stress, oppositely directed actions occur on the travelling times. By connecting the two oscillators to a subtractive mixer, a measuring signal is obtained, whose frequency represents the variation between the pressures to be measured. It is known to uniformly apply the two pressures to be measured on either side of the piezoelectric plate, which supplies a pressure equal to the difference of the acting pressures. In this case, the exchange areas of the elastic surface waves are arranged asymmetrically in order that the frequencies of the oscillators vary in opposite directions and their effects are added after subtractive mixing.

This solution has a number of disadvantages. One of the fluids is in contact with the face of the piezoelectric plate which propagates the elastic surface waves. There can be significant disturbance to the propagation of elastic surface waves if the gas contains moisture and dust. The asymmetric positioning of the delay lines means that it is not easy to effectively compensate thermal drift.

BRIEF SUMMARY OF THE INVENTION

In order to obviate these disadvantages, the invention provides for the symmetric arrangement on one of the faces of the deformable plate of the elastic surface wave means determining the tuning of the oscillators, accompanied by an asymmetric action of the two pressures on the other face of the plate. A third pressure can act on the face carrying the delay lines, but its influence is made insignificant after mixing the frequencies due to the intermediate support on which the plate rests.

The invention relates to a pressure transducer with elastic surface waves incorporating a deformable plate resting by its periphery on a support, first and second oscillator means, whose oscillation frequencies are determined by the first and second elastic surface wave exchange means located on one of the faces of said plate and mixer means supplying a signal, whose frequency is equal to the difference of the oscillation frequencies of the first and second oscillator means, wherein the deformable plates rest on at least one intermediate support permitting its pivoting, said support being fixed to the plate support, whilst the first and second exchange means are arranged in such a way that there are frequency shifts which are equal and of the same sign in the presence of a uniform mechanical stressing of the plate.

The invention also relates to the application of this type of transducer to ignition systems for internal combustion engines.

BRIEF DESCRIPTION OF THE DRAWINGS

The invention is described in greater detail hereinafter relative to non-limitative embodiments and the attached drawings, wherein show:

FIG. 2 an explanatory view.

FIG. 3 a constructional variant of the pressure transducer according to the invention.

FIG. 6 an isometric view of a constructional variant of a pressure transducer according to the invention.

DETAILED DESCRIPTION OF THE PREFERRED EMBODIMENTS

Figure 1:
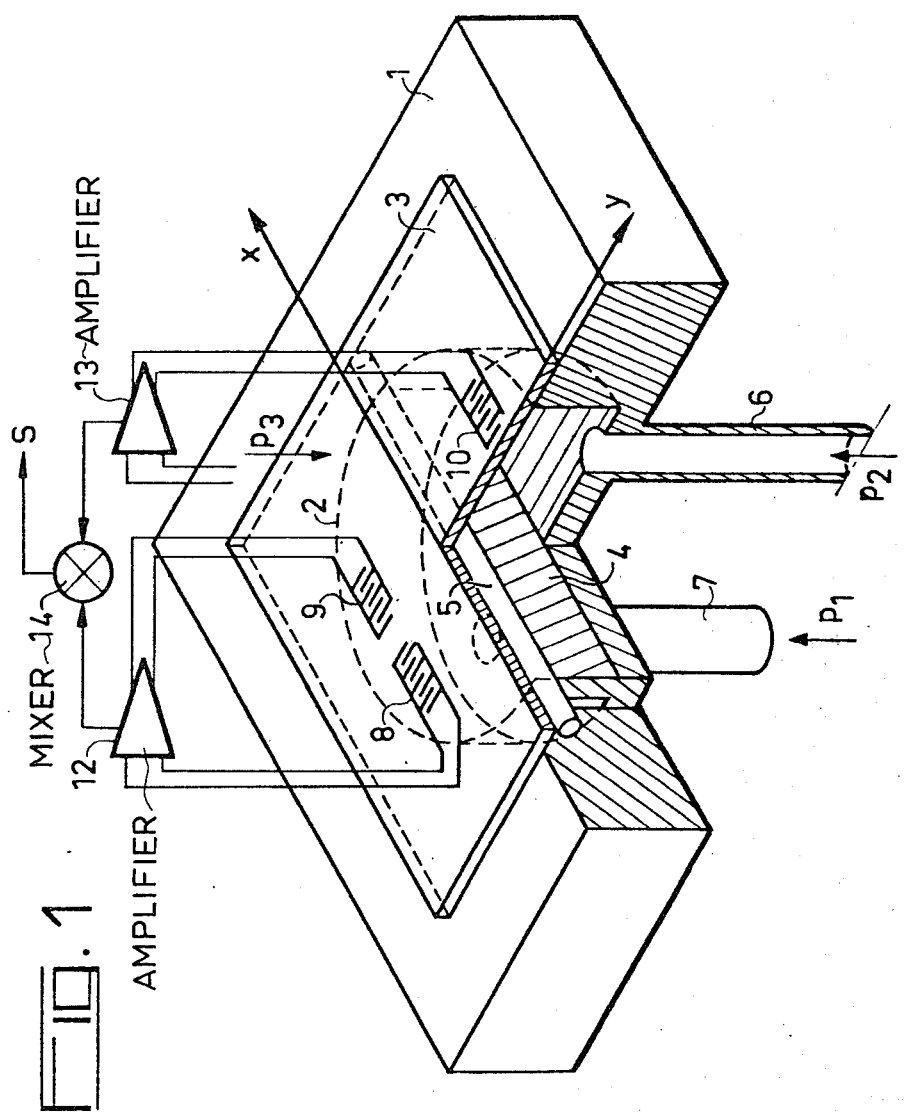
FIG. 1 a partial isometric view of a pressure transducer according to the invention.

FIG. 1 shows a support 1 which has in its centre a cylindrical cavity 2. This cavity 2 is closed by means of a plate 3 of piezoelectric material stuck to the upper flat face of support 1. A separating wall 4 integral with support 1 subdivides the cavity 2 into two semicylindrical chambers communicating respectively therefore with two tubes 6, 7. Plate 3 also rests on an intermediate support 5 which cooperates with the wall 4 in such a way that it supports plate 3 and forms a tight separation between the two semicylindrical chambers. Support 5 assumes the shape of a roller resting on a V-shaped groove of separating wall 4. The free face of plate 3 is provided with elastic surface wave transducers in the form of interdigitated conductive transducers 8, 9 and 10. Transducers 8 and 9 form a delay line connecting an amplifier 12. Transducers 10 cooperate with a set of transducers which are not shown in FIG. 1, so as to form another delay line which connects to amplifier 13. This amplifier forms with the exchange means for the elastic surface waves corresponding thereto an oscillator, whose oscillating frequency is for example approximately 100 megahertz. This oscillating frequency varies as a function of the mechanical stresses and tensions to which the plate 3 is exposed. The alternating voltages produced by the two oscillators are applied to a mixer 14 supplying at its output S an alternating signal whose frequency is the difference of the frequencies of the two incident voltages. In the case of FIG. 1, where the axis X is a diameter of the circular section of cavity 2, the two delay lines exchange the elastic surface waves parallel to axis X and are arranged symmetrically relative to this axis. The contact edge of support 5 is perpendicular to axis X. Under these conditions, if the only stress exerted on plate 3 is due to the uniformly distributed action of pressure $p_3$, the oscillator frequencies vary in the same way in magnitude as in sign. This applies in the case of a plate 3 having parallel faces cut in a homogeneous material such as quartz or lithium niobate.

In FIG. 2, the plate 3 is diagrammatically shown at (a), whereby it is clamped at both ends and its centre rests on a support 5. The two delay lines are represented by the two transducers 9 and 10 which emit the surface waves perpendicularly to the plane of the drawing. It is possible to see at (a) a dotted line representing the curved portion 48 of the plate, when the latter undergoes a stress formed from the action of pressure $p_3$ over the entire extension of the upper face. Pressure $p_3$ is for example atmospheric pressure and it is assumed that at (a) no other pressure acts on the plate. It is possible to see at (b) a curve 45 representing the supplementary deformation to be algebraically added to the curved portion 48, when a pressure $p_1$ acts on portion AO of the lower face of plate 3. At (c), it is possible to see a curve 46 representing the supplementary deformation to be algebraically added to the curved portion 48, when a pressure $p_2$ acts on portion OB of the lower face of plate 3. All these deformations occur in the linear range of Hooke's law in such a way that the superimposition principle is applicable thereto. Examination of FIG. 2 shows that an asymmetric loading of plate 3 due to the action of pressures $p_1$ or $p_2$ leads to an asymmetry of the curved portion 48 associated with a pivoting of the cross-section overhanging support 5. The oscillating frequencies determined by the elastic surface wave exchange means 9 and 10 are subject to unequal variation which causes a frequency shift proportional to the differences of pressures $p_1$ and $p_2$. If the exchange means are arranged symmetrically relative to support 5, the oscillating frequency shift does not depend on pressure $p_3$.

The properties referred to hereinbefore can be analysed in greater detail with reference to FIG. 3. Plate 3 is located between two fitting means 15 and 17 integral with support 47. Support 16 is located at distances l and l' on the fitting means. Plate 3 is provided with oscillator systems $L_1, A_1, L_2, A_2$ and $L_3 A_3$ which detect the stresses occurring in the upper face of FIG. 3 at three separate locations, as illustrated in FIG. 3. Subtractive mixers $M_{13}, M_{12}$ and $M_{23}$ supply signals, whose frequencies can be calculated as follows. If $p_1, p_2$ and $p_3$ are the pressures acting on plate 3 and if $\Delta f_1, \Delta f_2$ and $\Delta f_3$ are respectively the frequency variations produced by oscillator systems $L_1 A_1, L_2 A_2, L_3 A_3$ we obtain:

$$\Delta f_1 = k_1[(p_3 - p_1) - a_1(p_3 - p_2)] \quad (1)$$

$$\Delta f_2 = k_2[-(p_3 - p_1) - a_2(p_3 - p_2)] \quad (2)$$

$$\Delta f_3 = k_3[(p_3 - p_2) - a_3(p_3 - p_1)] \quad (3)$$

in which $k_1, k_2, k_3, a_1, a_2$ and $a_3$ are constant factors.

To ensure that plate 3 does in fact rest on support 16, it has been assumed that pressure $p_3$ is equal to or higher than pressures $p_1$ and $p_2$.

If $l = l'$ and if the oscillator systems $L_1 A_1, L_2 A_2, L_3 A_3$ have the same characteristics, $k_1$ and $k_3$ are equal, as are $a_1$ and $a_3$. Moreover, factor $a_2$ is equal to unity. Under these conditions, it is possible to state: $k_1 = k_3 = k$ and $a_1 = a_3 = a$ and by using the aforementioned equations we obtain:

$$\Delta f_1 - \Delta f_3 = k(1 + a)(p_2 - p_1) \quad (4)$$

If, in addition, means $L_1, L_2$ and $L_3$ are arranged in such a way as to satisfy $k = k_2$, we obtain:

$$\Delta f_2 - \Delta f_1 = k[2p_1 - p_3(3 - a) + p_1(1 - a)] \quad (5)$$

$$\Delta f_2 - \Delta f_3 = [2p_2 - p_3(3 - a) + p_1(1 - a)] \quad (6)$$

Equation (4) shows that the frequency of the alternating voltage available at the output of mixer $M_{13}$ is independent of $p_3$ and proportional to the differential pressure $p_2 - p_1$.

Equations (5) and (6) show that the frequency of the alternating voltage available at the output of one of the mixers $M_{12}$ or $M_{23}$ can be proportional to $(p_3 - p)$ when p represents a uniform pressure applied to the entire lower face of plate 3, which leads us to $p = p_1 = p_2$.

Figure 4:
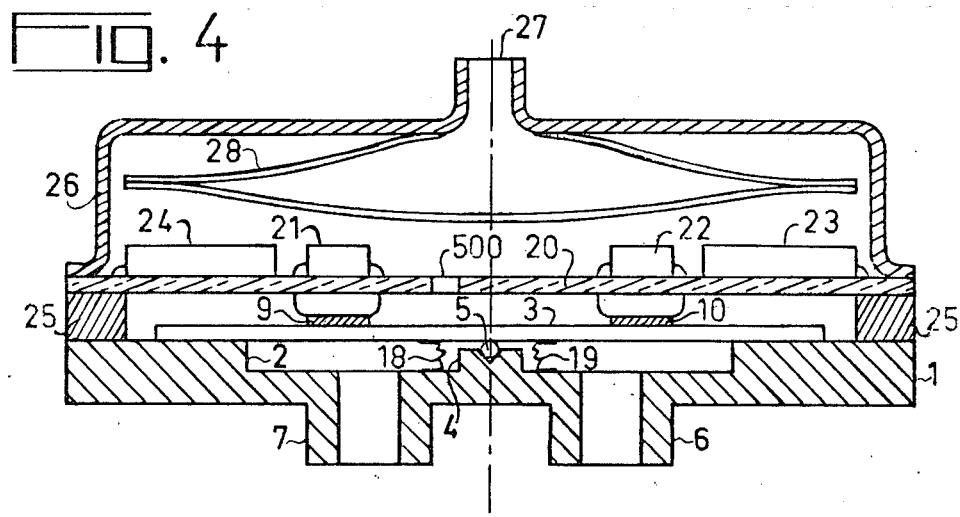
FIG. 4 a sectional view of a pressure transducer with its electronic components and a cover.

FIG. 4 is a sectional view of the pressure transducer realised in accordance with the information given hereinbefore. This transducer comprises a support base 1 having two tubes 7 and 6 communicating with a central cavity 2. A median shoulder 4 subdivides cavity 2 into two chambers. The piezoelectric plate 3 is stuck or embedded on the periphery of support 1. The dorsal face rests on a cylindrical support 5 carried by a V-shaped groove of shoulder 4. The sealing between the chambers is ensured by support 5 which can be made from an elastomer material. It can also be provided with flexible joints 18 and 19 stuck to the bottom of cavity 2 and to the dorsal face of plate 3, making it possible to make the supports 5 from a material which is not weighed down under the load. An annular spacer 25 is stuck to the periphery of support 1 for supporting a printed circuit 20 on which there are amplifiers 21 and 22, a mixer 23 and a regulated supply circuit 24. The frontal face of plate 3 carries the elastic surface wave exchange means 9 and 10, which can be constituted by interdigitated transducer delay lines or by reflector grating resonators. Means 9 and 10 are connected to amplifiers 21, 22 so as to form two oscillators supplying the inputs of mixer 23. An orifice 500 made in circuit 20 transmits the pressure beneath cover 26 to the frontal face of plate 3. A tube 27 makes it possible for there to be ambient pressure within the cover 26. To prevent moisture and dust from reaching the frontal face of plate 3, a deformable, tight bas 28 is provided within the said cover 26. This bas insulates the internal components of the transducer from any external pollution, but does not prevent the external and internal pressures from being balanced. The transducer of FIG. 4 serves more particularly for measuring the difference between two pressures $p_1$ and $p_2$ appearing at the input of tubes 7 and 6.

Figure 5:
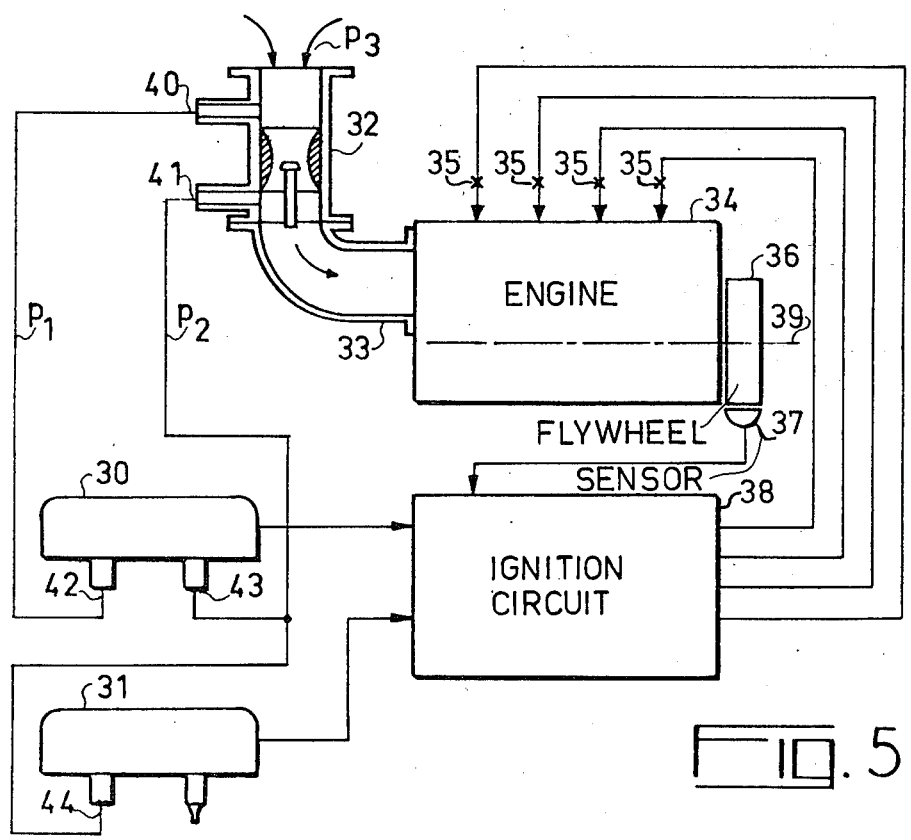
FIG. 5 an ignition system using pressure transducers.

FIG. 5 illustrates the application of the transducer of FIG. 4 to an ignition system for an internal combustion engine.

Engine 35 is supplied by a carburetor 32 connected to an inlet pipe 33. A pressure reducing device constituted by a nozzle constricts the flow of gas in such a way that a negative pressure is created between the two pipes 40 and 41. This negative pressure is a function of the air flow rate Q sucked in by the engine. To evaluate flow rate Q, a pressure transducer 30 is used, whose tubes 42 and 43 are respectively connected to the pressure intakes 40 and 41 of carburetor 43. Transducer 30 supplies ignition circuit 38 with a signal, whose frequency translates the variation in pressures $p_1$ and $p_2$, which increases with the flow rate Q. Another transducer 31 is used for measuring pressure $p_2$. For this purpose, tube 44 is connected to intake 41, the other tube being sealed after forming the vacuum in the chamber to which it is connected. Transducer 31 supplies information relative to the suction pressure received by ignition circuit 38. Information on the passage through the dead top centre is supplied to the ignition circuit 38 by a position sensor 37 located in the vicinity of the flywheel 36. This information makes it possible to determine the rotation speed of the engine shaft 39. Circuit 38 is therefore able to evaluate for all operating conditions the ignition advance angle and to supply at the appropriate time the high voltage pulse to the spark plugs 35.

FIG. 6 shows a constructional variant of the pressure transducer according to the invention. The elastic surface wave exchange means are constituted by resonators. The first resonator has two reflector gratings 50 and 51 defining a resonator cavity whose axis is parallel to the intermediate support 5. A transducer 55 couples the cavity to a negative resistance amplifier 57 so as to form a first tunable oscillator. The second resonator has reflector gratings 52, 53. Transducer 56 couples this cavity to amplifier 58 so as to form the second tunable oscillator. Tubes 6 and 7 are arranged laterally in this embodiment. The operation of the transducer of FIG. 6 can be compared with that of FIG. 1. When plate 3 is cut in quartz or crystalline lithium niobate the reflector gratings can be obtained by ionic bombardments. Two transducers connected by an amplifier can also be used in each cavity.

Although the preceding description has illustrated a plate 3 which is secured by its periphery, the invention is not limited to this fixing procedure. For example, it can be assumed that the plate 3 rests on its support via a peripheral flange forming a gasket. In this case, the exchange axes of the elastic surface waves would advantageously be located at a fifth of the plate extension. In the case of a plate with embedded edges, it is in the vicinity of the fixtures that the highest bending moments occur. In the case of FIG. 4, the intermediate support can also be provided on the upper face of plate 3. In this case, this upper support would rest on the printed circuit 20 and would make it possible to measure pressures $p_1$ and $p_2$, which can exceed pressure $p_3$.

A symmetrical arrangement of the pressure transducer makes it possible to obtain a very small thermal drift and an excellent immunity to variations in pressure $p_3$. In a simplified version, it is possible to eliminate bag 28 and pipe 27, because the pressure of the glass beneath the cover can increase with the temperature without this leading to a frequency drift at the outlet from mixer 14.

In the case where the intermediate support bears in the centre of the deformable area of plate 3, it is possible to provide a differential transducer by slightly modifying the construction illustrating in FIG. 4. The tube 6 can be eliminated and a communication channel created in a support 1 between the chamber into which issued tube 6 and the space between cover 26 and system 1-3. The resulting balancing of the pressure makes it possible to use the equation $p=p_3=p_2$. By introducing this into formula (2) and knowing that $a_2=1$, we obtain:

$$\Delta f_2 = k_2(p_1 - p) \quad (7)$$

This equation (7) shows that the thus modified transducer functions as a differential pressure measuring means between tubes 6 and 27. A transducer of absolute pressure p by pipe 27 is obtained by writing $p_1=0$ and forming a vacuum in the chamber connected to tube 7.

What is claimed is:

1. A pressure transducer with elastic surface waves incorporating a deformable plate (3) resting by its periphery on a support (1), first and second oscillator means (12, 13), whose oscillation frequencies are determined by the first and second elastic surface wave exchange means located on one of the faces of said plate and mixer means (14) supplying a signal, whose frequency is equal to the difference of the oscillation frequencies of the first and second oscillator means, wherein the deformable plate rests on at least one intermediate support (5) permitting its pivoting, said support being fixed to the plate support, while the first and second exchange means are arranged in such a way that there are frequency shifts which are equal and of the same sign in the presence of a uniform mechanical stressing of the plate.

2. A transducer according to claim 1, wherein the support has a cavity (2) subdivided into two adjacent chambers by a separating wall (4) which supports the intermediate support (5), sealing means being associated with the said wall in order to oppose any fluid transfer between the two chambers.

3. A transducer according to claim 2, wherein the opening giving access to cavity (2) has a symmetrical shape with respect to the contact line which is common to the intermediate support (5) and plate (3) covering the said opening.

4. A transducer according to claim 3, wherein the first and second elastic surface wave exchange means (8, 9, 10) are arranged symmetrically with respect to the contact line.

5. A transducer according to claim 2, wherein the chambers are connected to two pressurized fluid supply tubes (6, 7) for measuring a differential pressure.

6. A transducer according to claim 2, wherein one of the chambers is connected to a pipe (44) and the other chamber is connected to a vacuum chamber for measuring an absolute pressure.

7. A transducer according to claim 1, wherein it has third exchange means ($L_2$) and third oscillator means ($A_2$), the mixer means ($M_{12}$) supplying a signal, whose frequency is equal to the difference of the oscillating frequencies of the third oscillator means and one of the first and second oscillator means, whereby the third exchange means ($L_2$) overhang the intermediate support.

8. A transducer according to claim 1, wherein the elastic surface wave exchange means are delay lines.

9. A transducer according to claim 8, wherein the elastic surface wave exchange means function with interdigitated conductive transducers carried by a piezoelectric material.

10. A transducer according to claim 9, wherein the plate is cut into the said piezoelectric material.

11. A transducer according to claim 1, wherein the elastic surface wave exchange means are resonators (50, 51, 52, 53), each having two reflectors gratings.

12. A transducer according to claim 1, wherein the plate 3 is fixed at its periphery by sticking it to its support (1).

13. An ignition system for an internal combustion engine, using a first and a second transducer according to claim 1, wherein said internal combustion system is equipped with an ignition circuit and a carburetor, said carburetor comprising a nozzle constricting the flow of gas supplied to the engine and passing through the carburetor, said nozzle being equipped with pressure intakes connected through a first and a second pipe to said first transducer, said first transducer supplying said ignition circuit with a signal whose frequency indicates the pressure variation in said intakes, said second transducer having one of its chambers connected by a tube to said second pipe, the other of its chambers being sealed under vacuum.

14. A flow meter using a differential pressure transducer according to claim 1, comprising:
   a pressure reducing device constituted by a nozzle constricting the flow of gas to be measured in such a way that a negative pressure is created between two pressure intakes of said nozzle, said pressure intakes being connected to said differential pressure transducer.

* * * * *